(12) United States Patent
Ushijima

(10) Patent No.: US 9,054,362 B2
(45) Date of Patent: Jun. 9, 2015

(54) FIXED OXIDE FUEL CELL

(75) Inventor: Teruyuki Ushijima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 13/092,373

(22) Filed: Apr. 22, 2011

(65) Prior Publication Data

US 2011/0262827 A1 Oct. 27, 2011

(30) Foreign Application Priority Data

Apr. 23, 2010 (JP) .................................. 2010-099856

(51) Int. Cl.
*H01M 8/04* (2006.01)
*H01M 8/12* (2006.01)
*H01M 8/02* (2006.01)
*H01M 8/24* (2006.01)

(52) U.S. Cl.
CPC .............. *H01M 8/12* (2013.01); *H01M 8/0282* (2013.01); *H01M 8/24* (2013.01); *H01M 8/2485* (2013.01); *H01M 8/249* (2013.01); *H01M 2008/1293* (2013.01); *Y02E 60/521* (2013.01); *Y02E 60/525* (2013.01)

(58) Field of Classification Search
USPC .......................................... 429/460, 461, 459
See application file for complete search history.

(56) References Cited

U.S. PATENT DOCUMENTS

2003/0203267 A1\* 10/2003 Chou et al. ...................... 429/35
2004/0247980 A1\* 12/2004 Beatty et al. .................... 429/35
2009/0123799 A1\* 5/2009 Tsunoda ......................... 429/19
2010/0297521 A1\* 11/2010 Ogawa et al. ................. 429/456

FOREIGN PATENT DOCUMENTS

| JP | 2004-039573 A | 2/2004 |
| JP | 2004-227848 A | 8/2004 |
| WO | WO 2009093622 A1 \* | 7/2009 |

OTHER PUBLICATIONS

Japanese Office Action dated Sep. 3, 2013, issued in corresponding Japanese Application No. P2010-099856 along with a partial English Translation. (4 pages).

\* cited by examiner

*Primary Examiner* — Patrick Ryan
*Assistant Examiner* — Lucas J O Donnell
(74) *Attorney, Agent, or Firm* — Westerman, Hattori, Daniels & Adrian, LLP

(57) ABSTRACT

A fixed oxide fuel cell includes: a plurality of separators each having first and second opening portions, the separators being stacked such that a membrane electrode assembly is interposed between the separators and that the first opening portions are aligned coaxially in communication with each other to constitute a fuel gas manifold while the second opening portions are aligned coaxially in communication with each other to constitute an oxidant gas manifold, fuel gas and oxidant gas being supplied to the membrane electrode assembly via the fuel gas and oxidant gas manifolds; and silver plate layers provided between the separators for sealing joints in the fuel gas and oxidant gas manifolds.

11 Claims, 9 Drawing Sheets

FIXED OXIDE FUEL CELL

FIELD OF THE INVENTION

The present invention relates to fixed oxide fuel cells which include manifolds formed by separators sandwiching therebetween a membrane electrode assembly, and in which fuel gas and oxidant gas are supplied from the manifolds to the membrane electrode assembly.

BACKGROUND OF THE INVENTION

Fixed oxide fuel cells are known which are constructed to provide desired outputs by means of a stack of a multiplicity of fuel cells. In each of the fuel cells, separators are provided on the opposite surfaces of a membrane electrode assembly (also referred to as "MEA"), i.e. sandwich the membrane electrode assembly, via current collectors. With the current collectors interposed between the separators and the MEA, it is possible to secure given contact areas between the MEA and the separators while allowing manufacturing errors of the MEA and separators.

In each of the separators are formed gas flow paths (or gas passages) for directing fuel gas and oxidant gas to the MEA, and opening portions for directing fuel gas and oxidant gas to the gas flow paths. With a multiplicity of the fuel cells (i.e., separators) stacked together, the opening portions of the individual separators are positioned or aligned coaxially to form or constitute manifolds. Thus, fuel gas and oxidant gas can be supplied to the manifolds and then directed to the MEAs via the gas flow paths of the separators.

In order to form the manifolds by stacking a multiplicity of the separators, there is a need to seal between the stacked separators (i.e., jointed portions or joints of the manifolds) by means of seal portions so that the fuel gas and oxidant gas can be prevented from flowing out through the joints of the manifolds. Japanese Patent Application Laid-Open Publication No. 2004-39573 (hereinafter referred to as "relevant patent literature"), for example, discloses a fuel cell which seals between the stacked separators (joints of the manifolds) by means of seal portions made of glass.

In the fuel cell disclosed in the relevant patent literature, the glass-made seal portions seal between the stacked separators (joints of the manifolds). Therefore, when the fixed oxide fuel cell has varied relatively greatly in temperature, for example, it is difficult for the glass-made seal portions to follow the relatively great variation. As a consequence, the glass-made seal portions might be damaged due to the relatively great variation of the fuel cell, so that the fuel gas and oxidant gas might undesirably flow out from the manifolds.

SUMMARY OF THE INVENTION

In view of the foregoing prior art problems, it is an object of the present invention to provide an improved fixed oxide fuel cell which can reliably prevent fuel gas and oxidant gas from flowing out from respective manifolds.

In order to accomplish the above-mentioned object, the present invention provides an improved fixed oxide fuel cell, which comprises: a membrane electrode assembly; a plurality of separators each having first and second opening portions, the separators being stacked in such a manner that the membrane electrode assembly is interposed between the separators and that the first opening portions of the separators are aligned coaxially in communication with each other to thereby constitute a fuel gas manifold while the second opening portions of the separators are aligned coaxially in communication with each other to thereby constitute an oxidant gas manifold, fuel gas and oxidant gas being supplied to the membrane electrode assembly via the fuel gas and oxidant gas manifolds; and silver plate layers provided between the separators for sealing joints in individual ones of the fuel gas and oxidant gas manifolds.

In the fixed oxide fuel cell of the present invention, the silver plate layers are provided, as seal portions, between the separators for sealing joints in the fuel gas and oxidant gas manifolds. With the silver plate layers provided as seal portions, the present invention can increase rigidity (toughness, tenacity, etc.) of the seal portions as compared to the case where the seal portions are formed of glass. Thus, even when the fixed oxide fuel cell of the present invention has varied relatively greatly in temperature, it can prevent the seal portions (silver plate layers) from being damaged due to the relative great temperature variation. In this way, the fixed oxide fuel cell of the present invention can reliably prevent fuel gas and oxidant gas from flowing out of the fuel gas and oxidant gas manifolds.

Preferably, the fixed oxide fuel cell of the present invention further comprises insulating communication sections provided in individual ones of the fuel gas and oxidant gas manifolds and disposed between the separators, each of the insulating communication sections having a communicating hole. In each of the manifolds, the first or second opening portions of the separators are aligned coaxially in communication with each other via the communicating hole of the communication section, and the silver plate layer is provided on each seal surface, facing one of the separators, of the communication section.

If silver plate layers are to be provided (i.e., silver plating processing is to be performed) on the separators too, then the silver plating processing might be performed even on portions where such silver plating processing is unnecessary, and thus, it will be difficult to reduce an amount of silver used. In addition to the first and second opening portions constituting the manifolds, each of the separators has other gas passages. Thus, in the case where the separators are also to be subjected to the silver plating processing, a masking member is required to not only cover or mask the first and second opening portions but also mask the other gas passages. As a consequence, the required masking member would undesirably be complicated in shape.

This is why the silver plate layers are provided on the seal surfaces of the communication section in the present invention. Namely, in the present invention, silver plating is provided only on each of the seal surfaces of the communication sections; namely, the silver plating can be provided only on portions that require the silver plating (i.e., only on the seal portions of the fuel gas and oxidant gas manifolds). In this way, it is possible to minimize the amount of silver used.

Further, in the present invention, the communication section only has the communicating hole constituting the fuel gas or oxidant gas manifold. Thus, when providing the silver plating on the seal surfaces of the communication section, it is not necessary to cover or mask the other gas passages (gas flow paths) with a masking member. Namely, because only the communicating holes constituting the manifolds have to be covered or masked with a masking member, the present invention permits simplification in shape of the masking member.

Preferably, the silver plate layer is formed for sealing between the seal surface of the communication section and the separator, by: placing the communication section between the separators after providing silver plating on the seal surface of the communication section; applying a predetermined load to the separators and the communication section; and melting the silver plating at a predetermined temperature. Thus, with the present invention, it is possible to appropriately seal between the separator and the seal surface of the communication section, with the predetermined load, which is to be applied to the separators and the communication section, kept at a low level. By thus limiting the predetermined load, which is to be applied to the separators and the communication section, to a low level range, the present invention can advantageously reduce a size of facilities for forming the silver plating.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
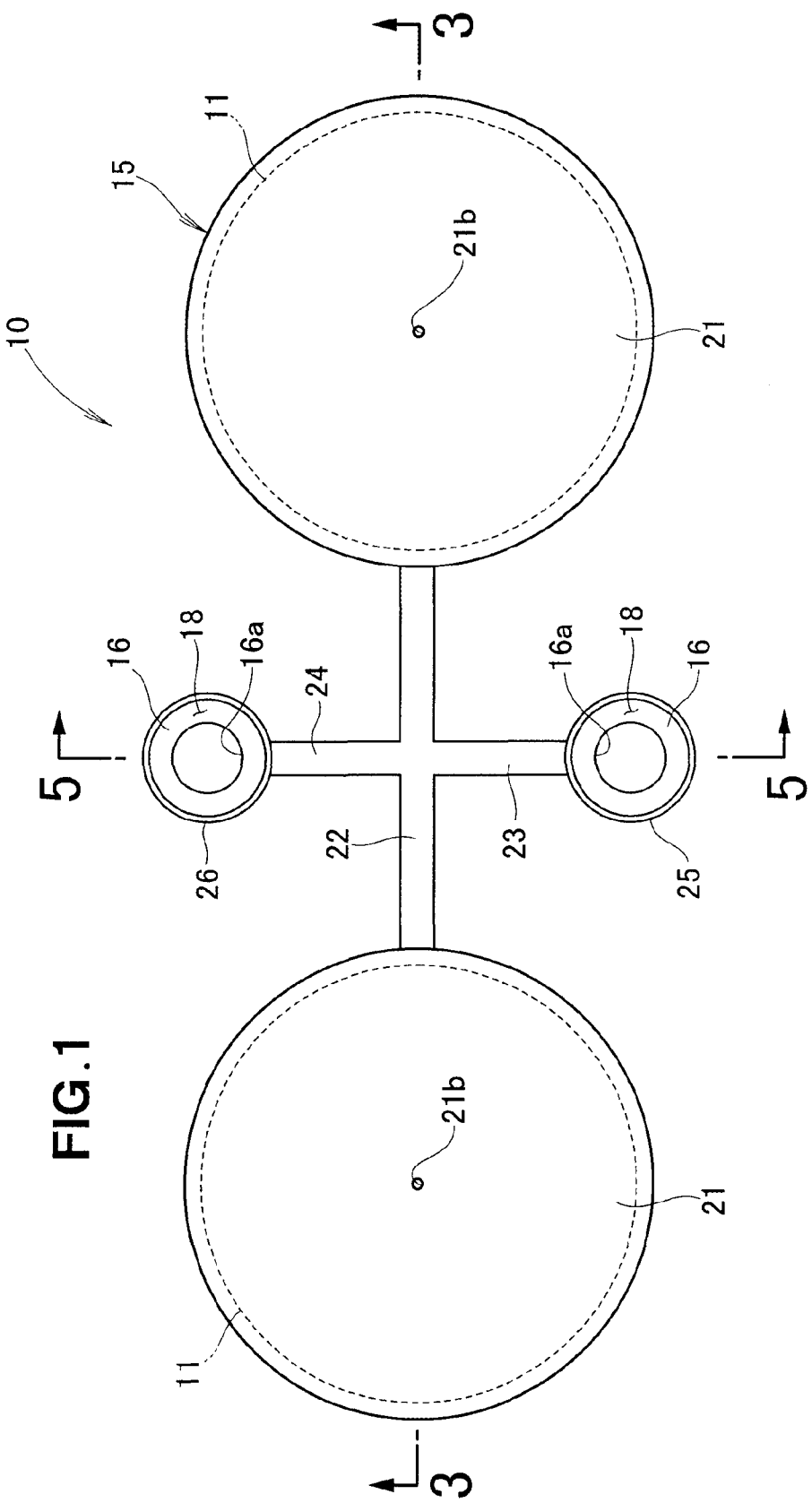
FIG. 1 is a plan view showing a fixed oxide fuel cell according to an embodiment of the present invention.
Figure 2:
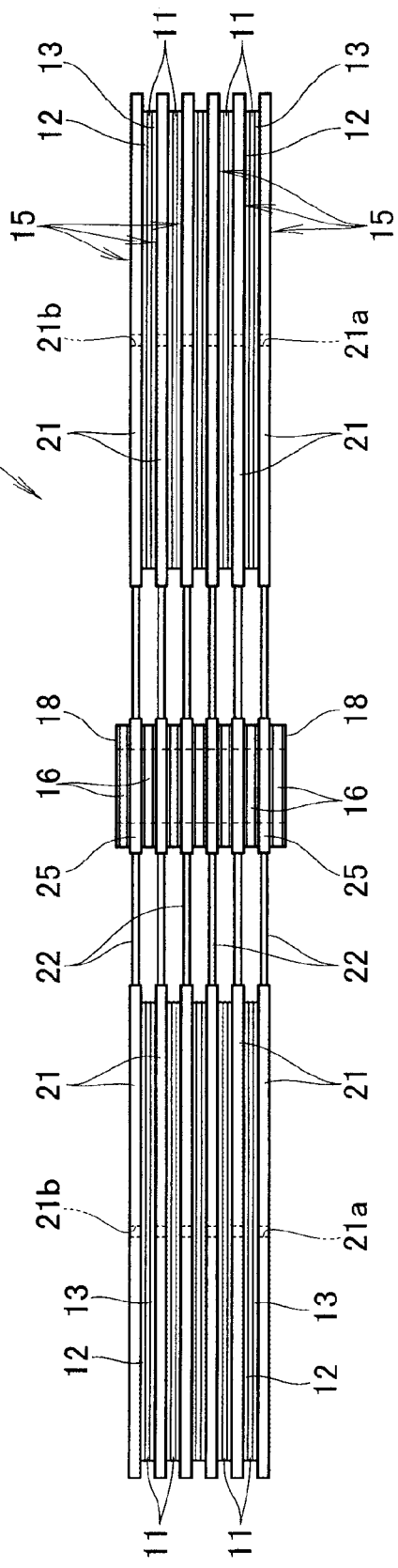
FIG. 2 is a side view of the fixed oxide fuel cell of FIG. 1.
Figure 3:
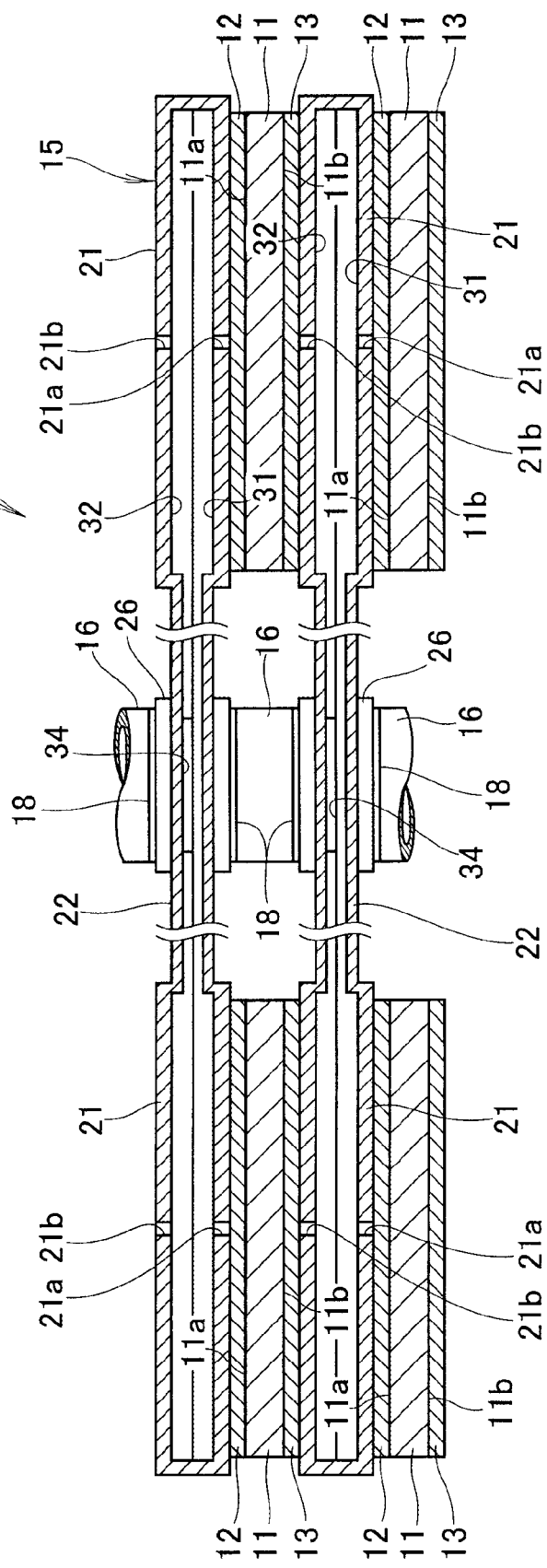
FIG. 3 is a sectional view taken along line 3-3 of FIG. 1.

Reference is now taken to FIG. 1 showing, in plan, an embodiment of a fixed oxide fuel cell, FIG. 2 is a side view of the fixed oxide fuel cell shown in FIG. 1, and FIG. 3 is a sectional view taken along the 3-3 line of FIG. 1. As shown in FIGS. 1 and 2, the fixed oxide fuel cell 10 comprises a stack of: a plurality of membrane electrode assemblies (MEAs) 11; a plurality of pairs of current collectors 12 and 13, each of the pairs disposed over the opposite surfaces 11a and 11b (see FIG. 3) of one of the MEAs 11; a plurality of separators 15, every adjoining two of them disposed over one of the pairs of current collectors 12 and 13; a plurality of insulating communication sections 16 each disposed between the separators 15; and a plurality of silver plate layers 18 each provided on one of the insulating communication sections 16 to seal between the one insulating communication sections 16 and one of the separators 15 adjoining the one insulating communication sections 16.

As shown in FIG. 3, each of the MEAs 11 includes a fixed oxide electrolyte membrane, and a fuel electrode layer and an air electrode layer disposed on the opposite surfaces of the electrolyte membrane. A fuel-side gas diffusion layer is disposed on the fuel electrode layer, while an air-side gas diffusion layer is disposed on the air electrode layer.

Each of the MEAs 11 is sandwiched or interposed between a pair of the separators 15 (more specifically, between a pair of circular plate sections 21 of the separators 15) via the current collectors 12 and 13, and each of the MEAs 11 is formed as a circular plate slightly smaller than the circular plate section 21 as seen in FIG. 1.

Each of the current collectors 12 and 13 is a sheet member formed in a circular shape similarly to the MEA 11. By being interposed between the MEA 11 and the separator 15, each of the current collectors 12 and 13 can secure a given contact area between the MEA 11 and the separator 15 while allowing manufacturing errors of the MEA 11 and separator 15.

Figure 4:
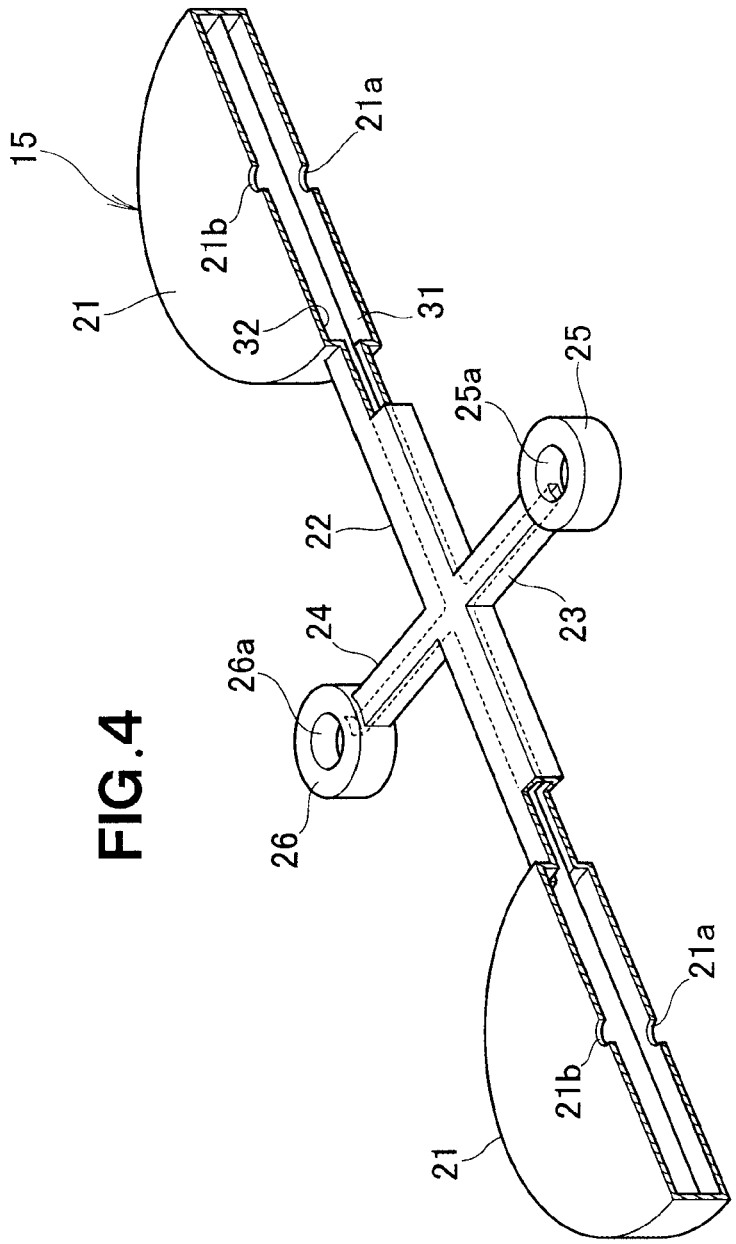
FIG. 4 is a perspective view showing a separator provided in the embodiment.
Figure 5:
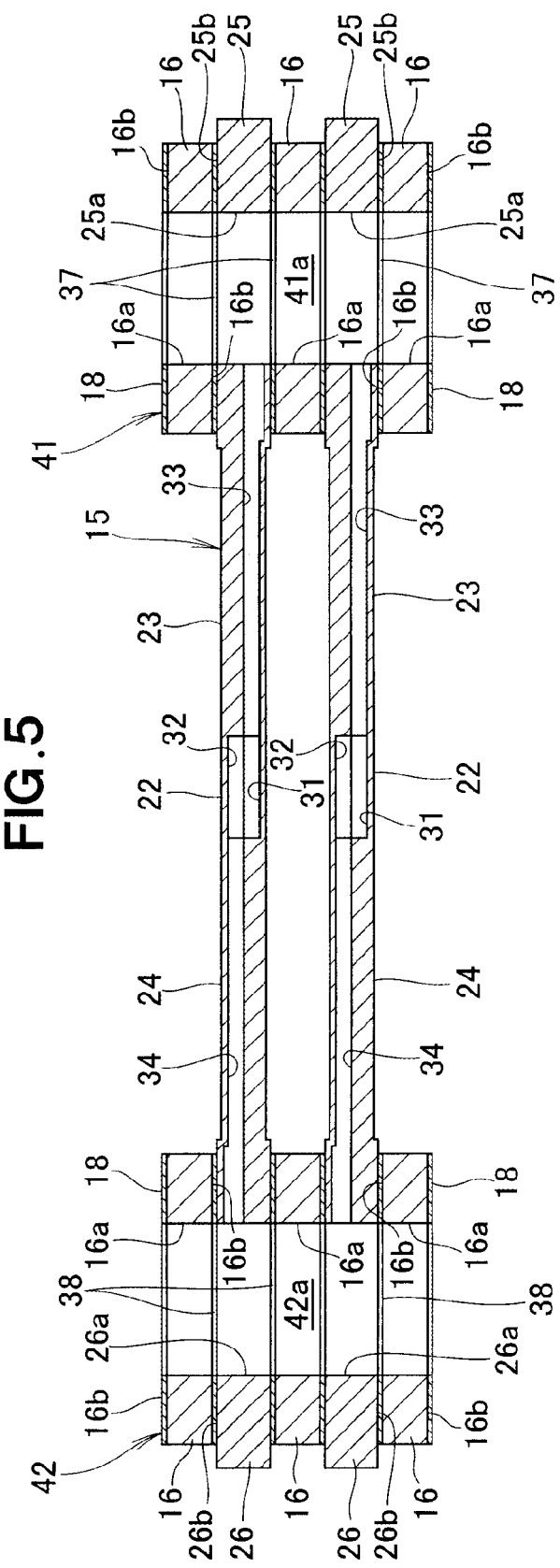
FIG. 5 is a sectional view taken along line 5-5 of FIG. 1.

As shown in FIGS. 3 to 5, each of the separators 15 integrally includes: a pair of the circular plate sections 21 opposed spaced apart from each other by a predetermined interval; a connection bar 22 interconnecting the pair of the circular plate sections 21; a first extension section 23 extending perpendicularly outwardly from a substantially longitudinally-middle portion of the connection bar 22; a first passage section 25 provided on a distal end portion of the first extension section 23; a second extension section 24 extending perpendicularly outwardly from the substantially longitudinally-middle portion of the connection bar 22 in a direction opposite from the first passage section 25; and a second passage section 26 provided on a distal end portion of the second extension section 24.

First and second gas passages 31 and 32 are formed within the pair of the circular plate sections 21 and the connection bar 22. A first gas ejection hole 21a is formed in a lower central portion of each of the circular plate sections 21, while a second gas ejection hole 21b is formed in an upper central portion of each of the circular plate sections 21. The first gas ejection hole 21a is in communication with the first gas passage 31, while the second gas ejection hole 21b is in communication with the second gas passage 32.

The first extension section 23 has a third gas passage 33 formed therein in communication with the first gas passage 31. The first passage section 25 is formed in a cylindrical shape and has a first opening portion 25a formed centrally therein in communication with the third gas passage 33. The insulating communication sections 16 and the first passage sections 25 are alternately stacked in coaxial relation to each other.

The second extension section 24, extending in the opposite direction from the first passage section 25, has a fourth gas passage 34 formed therein in communication with the second gas passage 32.

The second passage section 26, which is symmetrical to the first passage section 25 about the connection bar 22, is formed in a cylindrical shape and has a second opening portion 26a formed centrally therein in communication with the fourth gas passage 34. The insulating communication sections 16 and the second passage sections 26 are alternately stacked in coaxial relation to each other.

Figure 6:
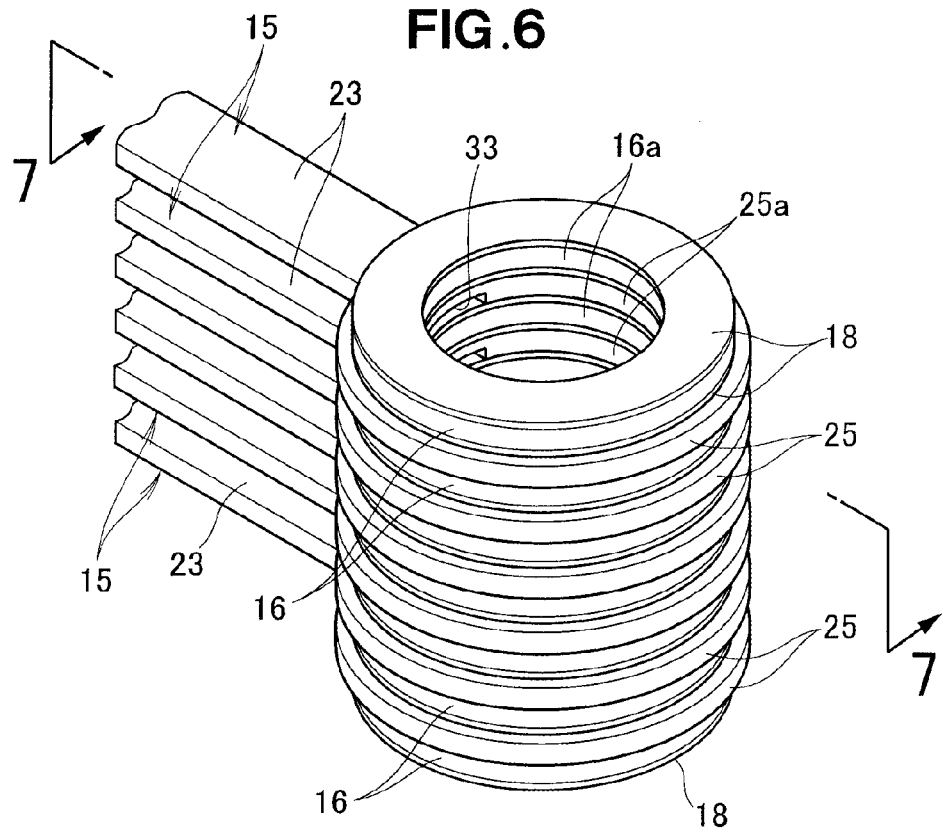
FIG. 6 is a perspective view showing a manifold of the fixed oxide fuel cell shown in FIG. 2.
Figure 7:
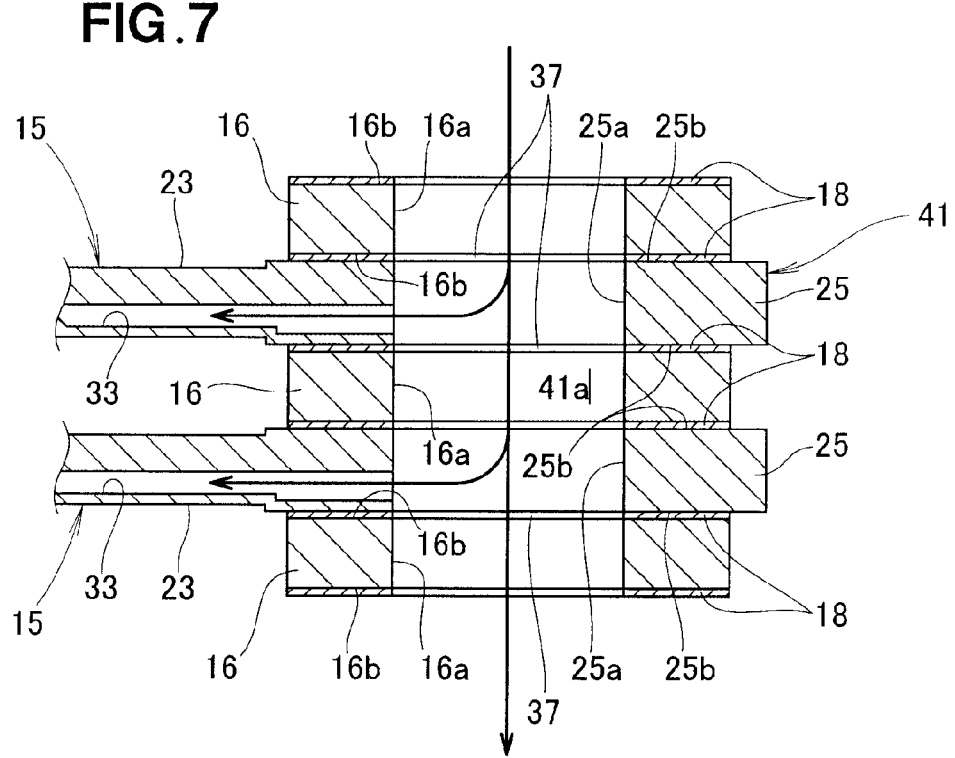
FIG. 7 is a sectional view taken along line 7-7 of FIG. 6.

As shown in FIGS. 6 and 7, each of the communication sections 16 is, for example, in the form of a hollow cylindrical member formed of an insulating material, such as aluminum (aluminum oxide). The communication section 16 is slightly smaller in outer diameter than the first and second passage sections 25 and 26, and has a communicating hole 16a formed centrally therethrough. Thus, on one end (lower end in FIG. 1) of the fuel cell, as shown in FIG. 5, the communication sections 16 are disposed in communication with and in coaxial relation with the first opening portions 25a. Further, on another end (upper end in FIG. 1) of the fuel cell, the communicating holes 16a are disposed in communication with and in coaxial relation with the second opening portions 26a.

More specifically, as further shown in FIGS. 5 and 7, the opposite surfaces (seal surfaces) 16b of each of the communication sections 16, which are interposed between the first passage sections 25, contact the first passage sections 25 via the silver plate layers 18. Similarly, the opposite surfaces (seal surfaces) 16b of each of the communication sections 16, which are interposed between the second passage sections 26, contact the second passage sections 26 via silver plate layers 18.

Namely, each of the communication sections 16 has the seal surfaces 16b on its opposite surfaces. Except for the uppermost and lowermost seal surfaces 16b, each of the seal surfaces 16b faces one of the separators 15. The seal surfaces 16b are each a doughnut-shaped flat surface (see FIG. 6). On the one end of the fuel cell, the seal surfaces 16b are formed to be capable of contacting the opposite surfaces of the first passage sections 25. Similarly, on the other end of the fuel cell, the seal surfaces 16b are formed to be capable of contacting the opposite surfaces of the first passage sections 25. The silver plate layer 18 is provided on each of the doughnut-shaped flat surfaces 16b.

By being provided on each of the seal surfaces 16b on the one end of the fuel cell, the silver plate layer 18 functions as a seal portion for sealing a joint (manifold joint) 37 between the communication section 16 and the first passage section 25 of the separator 15.

Thus, a fuel gas manifold 41 is constituted by the first passage sections 25 and the communication sections 16 being alternately stacked and by the joints 37 between the first passage sections 25 and the communication sections 16 being sealed by means of the silver plate layers 18.

The fuel gas manifold 41 includes a fuel gas manifold passage 41a formed by the plurality of communicating holes 16a and plurality of first opening portions 25a. The fuel gas manifold passage 41a of the fuel gas manifold 41 branches into the plurality of third gas passages 33. Thus, fuel gas supplied to the fuel gas manifold passage 41a can be directed to the plurality of third gas passages 33 as indicated by arrows in FIG. 7.

Further, by being provided on each of the seal surfaces 16b on the other end of the fuel cell, the silver plate layer 18 functions as a seal portion for sealing a joint (manifold joint) 38 between the communication section 16 and the second passage section 26.

Thus, an oxidant gas manifold 42 is constituted by the second passage sections 26 and the communication sections 16 being alternately stacked and by the joints 38 between the second passage sections 26 and the communication sections 16 being sealed by means of the silver plate layers 18.

The oxidant gas manifold 42 includes an oxidant gas manifold passage 42a formed by the communicating holes 16a and second opening portions 26a. The oxidant gas manifold passage 42a branches into the plurality of fourth gas passages 34. Thus, fuel gas supplied to the oxidant gas manifold passage 42a can be directed to the plurality of fourth gas passages 34, in a similar manner to fuel gas supplied to the fuel gas manifold passage 41a.

Namely, in each of the manifolds 41 and 42, the first or second opening portions 25a or 26a of the separators 15 are aligned coaxially in communication with one another via the communicating holes 16a of the communication sections 16.

As well known, the silver plate layer 18 has superior electrical conductivity. Thus, the fixed oxide fuel cell 10 is constructed to secure electrical insulation between the separators 15 by means of the communication sections 16 interposed between the separators 15. Namely, the communication sections 16 are members that not only secure electrical insulation between the separators 15 but also constitute the fuel gas manifold 41 and oxidant gas manifold 42.

As set forth above, the fixed oxide fuel cell 10 includes the fuel gas manifold 41 and oxidant gas manifold 42 constituted by the alternate stacking of the separators 15 and communication sections 16.

Further, in order to seal the joints 37 and 38 of the fuel gas manifold 41 (manifold passage 41a) and oxidant gas manifold 42 (manifold passage 42a), the silver plate layers 18 are provided between the separators 15 and the communication sections 16 so as to function as seal portions.

With the silver plate layers 18 provided as seal portions, the fixed oxide fuel cell 10 can increase rigidity (toughness, tenacity, etc.) of the seal portions as compared to the case where the seal portions are formed of glass. Thus, even when the fixed oxide fuel cell 10 has varied relatively greatly in temperature, it can prevent the seal portions (silver plate layers 18) from being damaged due to the relative great temperature variation.

In the aforementioned manner, the fixed oxide fuel cell 10 can prevent fuel gas and oxidant gas from flowing out of the fuel gas manifold 41 (fuel gas manifold passages 41a) and oxidant gas manifold 42 (oxidant gas manifold passages 42a).

Next, with reference to FIGS. 8 and 9, a description will be given about a manner in which fuel gas and oxidant gas are supplied to the MEAs 11 in instant embodiment of the fixed oxide fuel cell 10.

Figure 8A:
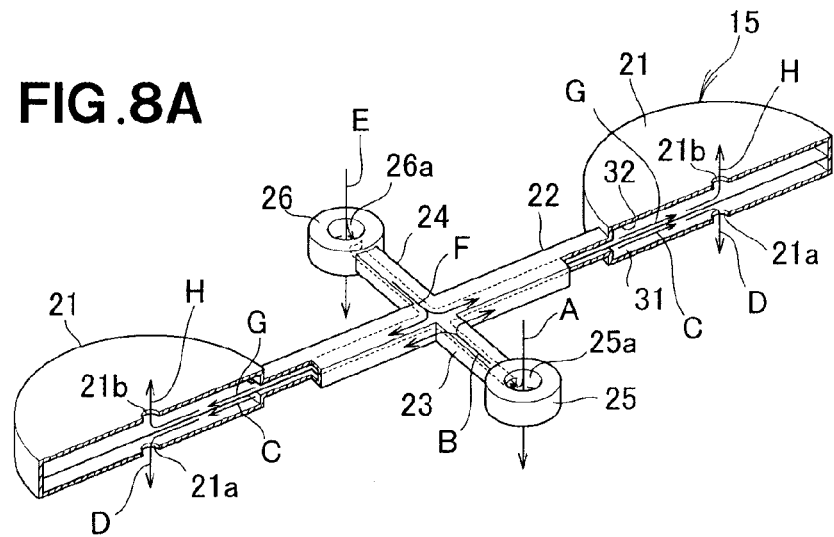
FIGS. 8A and 8B are views explanatory of a manner in which fuel gas and oxidant gas are directed from the manifolds in the embodiment.
Figure 8B:
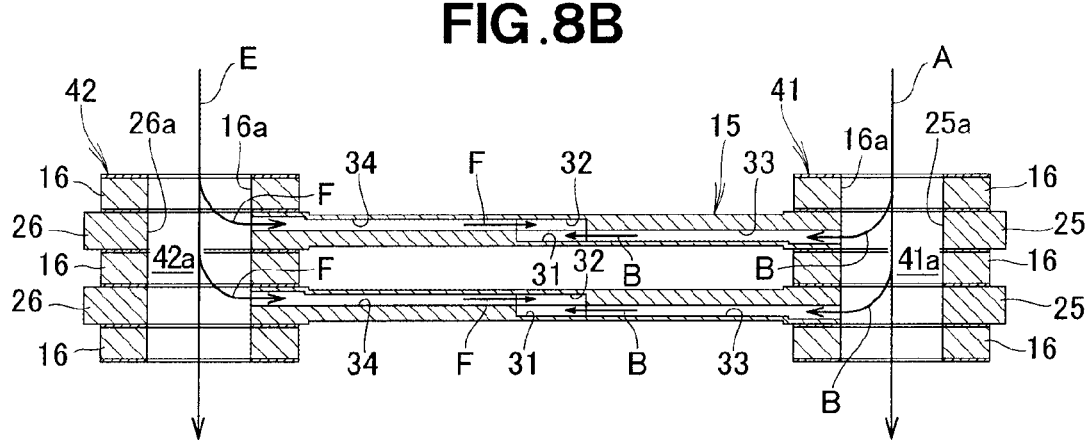
Figure 9:
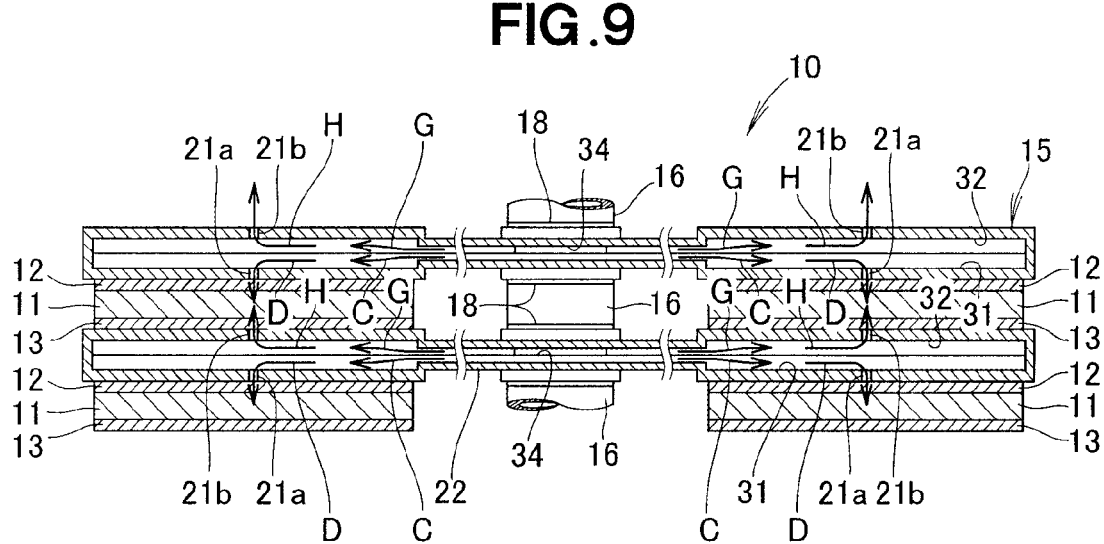
FIG. 9 is a view explanatory of a manner in which the fuel gas and oxidant gas are directed to a membrane electrode assemblies in the embodiment.

As shown in FIGS. 8A and 8B, fuel gas is supplied to the fuel gas manifold passage 41a as indicated by arrow A, and the fuel gas of the fuel gas manifold passage 41a can be directed to the plurality of third gas passages 33 as indicated by arrow B.

The fuel gas is then directed to the plurality of first gas passages 31, via which the fuel gas is then directed to the pairs of the circular plate sections 21 as indicated by arrow C. As shown in FIG. 9, the fuel gas having been directed to the pairs of the circular plate sections 21 is directed via the first gas ejection holes 21a and current collectors 12 toward the fuel electrodes of the MEAs 11, as indicated by arrow D.

Further, as shown in FIGS. 8A and 8B, oxidant gas is supplied to the oxidant gas manifold passage 42a as indicated by arrow E, and the oxidant gas of the oxidant gas manifold passage 42a can be directed to the plurality of fourth gas passages 34 as indicated by arrow F.

The fuel gas is then directed to the plurality of second gas passages 32, via which the fuel gas is then directed to the pairs of the circular plate sections 21 as indicated by G. As shown in FIG. 9, the oxidant gas having been directed to the pairs of the circular plate sections 21 is directed via the second gas ejection holes 21b and current collectors 13 toward the air electrodes of the MEAs 11.

Figure 10A:
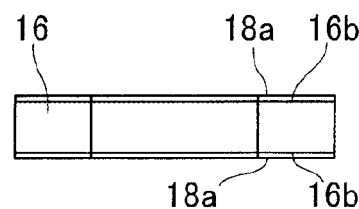
FIGS. 10A to 10C are views explanatory of a manner in which silver plate layers seal between communication sections and first passage sections in the embodiment.
Figure 10B:
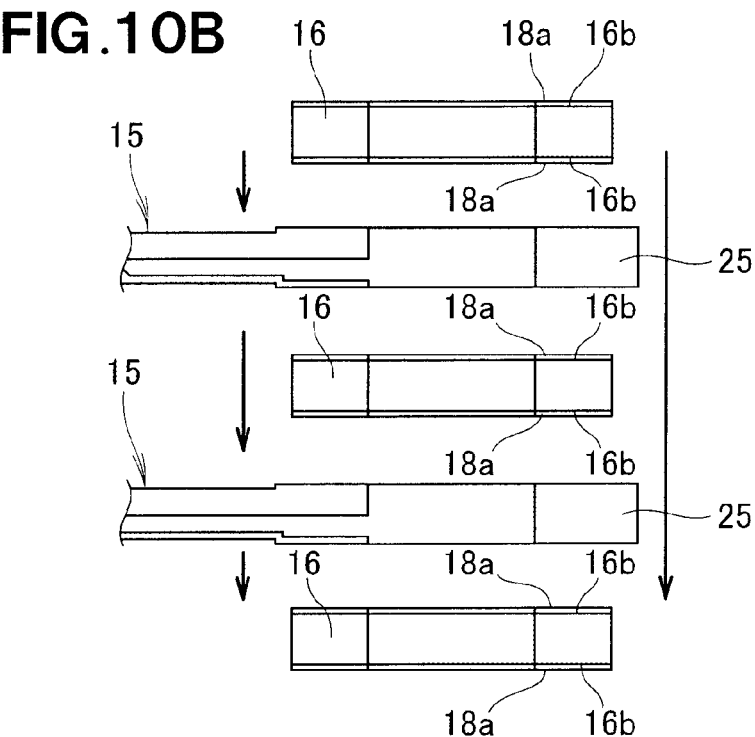
Figure 10C:
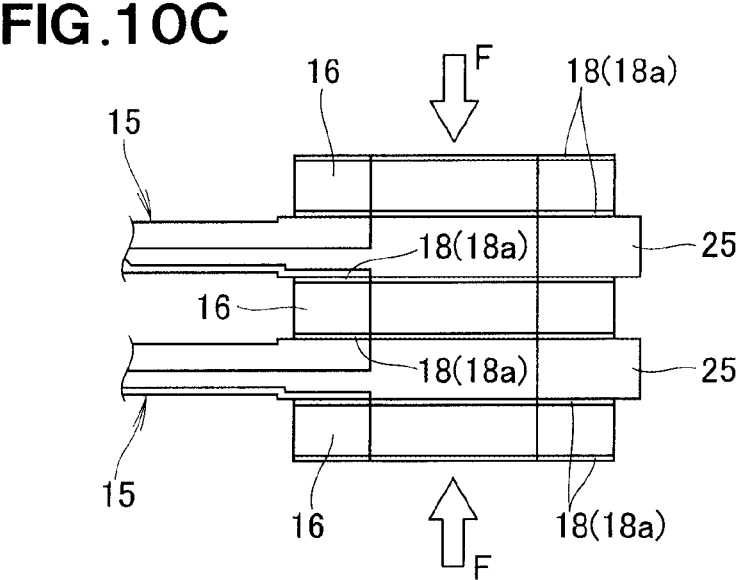

With reference to FIGS. 10A to 10C, the following describe a manner in which the silver plate layers 18 seal between the communication sections 16 and the first passage sections 25.

As shown in FIG. 10A, silver plating processing is performed on each of the seal surfaces 16b of the communication sections 16 to form silver plating 18a. For example, the silver plating 18a thus formed on the seal surface 16b has a thickness of 5-30 μm.

The silver plating 18a is provided only on each of the seal surfaces 16b of the communication sections 16; namely, the plating processing can be performed only on portions that require the plating (i.e., only on the seal portions of the gas passages). In this way, it is possible to minimize an amount of silver used.

In the instant embodiment, each of the communication sections 16 only has the communicating hole 16a constituting the fuel gas manifold passage 41a. Thus, when forming the silver plating 18a on the seal surfaces 16b of the communication sections 16, it is not necessary to cover or mask the first and second gas ejection holes 21a and 21b with a masking member (not shown) in the separators 15. Namely, because only the communicating holes 16a constituting the fuel gas manifold passage 41a have to be covered or masked with a masking member (not shown), the instant embodiment permits simplification in shape of the required masking member.

By contrast, if the separators 15 of FIG. 4 are also subjected to the silver plating processing, then the silver plating processing might be performed even on portions where the silver plating processing is unnecessary, and thus, it will be difficult to reduce the amount of silver to used.

In addition to the fuel gas manifold passage 41a, each of the separators 15 has the first and second gas ejection holes 21a and 21b as other gas passages. Thus, in the case where the separators 15 of FIG. 4 are also subjected to the silver plating processing, a masking member is required to not only cover or mask the first and second opening portions 25a and 26a, constituting the manifold passages 41a and 42a, but also mask the first and second gas ejection holes 21a and 21b. As a consequence, the required masking member would be undesirably complicated in shape.

After the silver plating 18a has been formed on each of the silver plates 18a, the communication sections 16 and the first passage sections 25 are stacked alternately (with each of the first passage sections 25 between the communication sections 16), as shown in FIG. 10B.

Then, as shown in FIG. 10C, a predetermined load F is applied to the first passage sections 25 and communication sections 16, and the silver plating 18a is melted (softened) at a predetermined temperature T1. Although it is preferable that the predetermined load F be limited to below a relative low level, such as 15 kgf/mm² (147 N/mm²), the predetermined load F may be selected and set from a load range of 5-25 kgf/mm² (49-245 N/mm²). The predetermined temperature T1 is, for example, set to a range of 300-850° C. In this way, the silver plating 18 is formed to seal between the seal surfaces 16b of the communication sections 16 and the first passage sections 25.

As set forth above, the silver plating 18a is melted at the predetermined temperature T1 for sealing between the seal surfaces 16b and the first passage sections 25. Thus, the silver plating 18a can appropriately seal between the seal surfaces 16b of the communication sections 16 and the first passage sections 25, with the predetermined load F, which is to be applied to the first passage sections 25 and communication sections 16, kept at a low level. Namely, by limiting the predetermined load F to be applied to the first passage sections 25 and communication sections 16 to the low level range of 5-25 kgf/mm² (49-245 N/mm²), it is possible to reduce a size of facilities for forming the silver plating 18a.

Whereas the foregoing have described the manner of sealing between the seal surfaces 16b and the first passage sections 25, sealing between the seal surfaces 16b and the second passage sections 26 is performed in the same manner as above.

It should be appreciated that the fixed oxide fuel cell 10 of the present invention is not limited to the above-described embodiment and may be modified variously.

For example, whereas the embodiment of the present invention has been described above in relation to the case where the fuel gas and oxidant gas manifolds 41 and 42 are constituted by alternately stacking the separators 15 and the communication sections 16, the present invention is not so limited, and the fuel gas and oxidant gas manifolds 41 and 42 may be constituted by stacking only the separators 15. In such a case, the silver plate layers 18 are provided as seal portions to seal between the separators 15, in order to seal the joints in the fuel gas and in the oxidant gas manifolds. However, because the silver plate layers 18 have superior electrical conductivity, there is a need to secure electrical insulation between the separators 15 by interposing insulating members between the separators 15.

Furthermore, whereas the embodiment of the present invention has been described above in relation to the case where the communication sections 16 are formed of aluminum (aluminum oxide), the present invention is not so limited, and the communication sections 16 may be formed of any other suitable material (insulating material), such as resin.

Furthermore, the shapes and constructions of the fixed oxide fuel cell 10, membrane electrode assembly (MEA) 11, separator 15, communication section 16, seal surface 16b, silver plate layer 18, first passage section 25, first opening portion 25a, second passage section 26, second opening portion 26a, joints 37 and 38, fuel gas manifold 41, oxidant gas manifold 42, etc. are not limited to the aforementioned and may be modified as needed.

The basic principles of the present invention are well suited for application to fixed oxide fuel cells which include manifolds formed by separators sandwiching membrane electrode assemblies, and in which fuel gas and oxidant gas are supplied from the manifolds to the membrane electrode assemblies.

What is claimed is:
1. A fixed oxide fuel cell comprising:
a plurality of membrane electrode assemblies;
a plurality of separators each having first and second opening portions, the respective separators separating the membrane electrode assemblies from one another, the separators being stacked in such a manner that the membrane electrode assemblies are interposed between the separators and that the first opening portions of the separators are aligned coaxially in communication with each other to thereby constitute a fuel gas manifold while the second opening portions of the separators are aligned coaxially in communication with each other to thereby constitute an oxidant gas manifold, fuel gas and oxidant gas being supplied to the membrane electrode assemblies via the fuel gas and oxidant gas manifolds;
silver plate layers provided between the stacked separators for sealing joints in the fuel gas and oxidant gas manifolds, and
insulating communication sections provided in individual ones of the fuel gas and oxidant gas manifolds and each disposed between the separators, each of the insulating communication sections having a communicating hole,
wherein, in each of the manifolds, the first or second opening portions of the separators are aligned coaxially in communication with each other via the communicating hole of the communication section, and the silver plate layer is provided on each seal surface, facing one of the separators, of the communication section and seals a joint between each seal surface of the insulating communication section and the one of the separators, wherein each of said plurality of separators is of an integrally formed hollow structure, wherein each of said plurality of separators includes a divider which bisects the hollow structure in a direction perpendicular to a direction in which the first and second opening portions of the separators are aligned coaxially, to define oxidant and fuel passages, and wherein, in each of the plurality of separators, at least a portion of the fuel passage vertically overlaps with at least a portion of the oxidant passage, in the direction in which the first and second opening portions of the separators are aligned coaxially.

2. The fixed oxide fuel cell according to claim 1, wherein the silver plate layer is formed by:

placing the communication section between the separators after providing silver plating on the seal surface of the communication section;

applying a predetermined load to the separators and the communication section; and melting the silver plating at a predetermined temperature.

3. The fixed oxide fuel cell according to claim 1, wherein the silver plate layer is only at a position where said plurality of separators face said insulating communication section.

4. The fixed oxide fuel cell according to claim 1, wherein said plurality of separators are not in direct contact with each other.

5. The fixed oxide fuel cell according to claim 2, wherein said plurality of separators are not in direct contact with each other.

6. The fixed oxide fuel cell according to claim 1, wherein the fuel passage is in communication with both the first opening portion and a fuel gas ejection hole which ejects fuel gas into a membrane electrode assembly, wherein the oxidant passage is in communication with both the second opening portion and an oxidant gas ejection hole which ejects oxidant gas into a membrane electrode assembly, wherein the fuel gas is ejected in a direction opposite to said oxidant gas.

7. The fixed oxide fuel cell according to claim 6, wherein each of the separators comprises two fuel gas ejection holes which are in communication with the fuel passage and the first opening portion, the first opening portion being disposed between the two fuel gas ejection holes, and wherein each of the separators comprises two oxidant gas ejection holes which are in communication with the oxidant passage and the second opening portion, the second opening portion being disposed between the two oxidant gas ejection holes.

8. The fixed oxide fuel cell according to claim 7, wherein, in each separator, a line connecting the two fuel gas ejection holes intersects with a line connecting the first opening portion and the second opening portion.

9. The fixed oxide fuel cell according to claim 7, wherein, in each separator, a line connecting the two oxidant gas ejection holes intersects with a line connecting the first opening portion and the second opening portion.

10. The fixed oxide fuel cell according to claim 7, wherein, in each separator, a line connecting the two fuel gas ejection holes is substantially perpendicular to a line connecting the first opening portion and the second opening portion.

11. The fixed oxide fuel cell according to claim 7, wherein, in each separator, a line connecting the two oxidant gas ejection holes is substantially perpendicular to a line connecting the first opening portion and the second opening portion.

* * * * *